United States Patent
Shojaie (12)

(10) Patent No.: US 6,371,452 B1
(45) Date of Patent: Apr. 16, 2002

(54) PACKING UNIT

(76) Inventor: Saeed M. Shojaie, 40 Arabian Ave., Alpharetta, GA (US) 30004

( * ) Notice: Subject to any disclaimer, the term of this patent is extended or adjusted under 35 U.S.C. 154(b) by 0 days.

(21) Appl. No.: 09/389,123

(22) Filed: Sep. 2, 1999

Related U.S. Application Data

(60) Provisional application No. 60/099,326, filed on Sep. 6, 1998.

(51) Int. Cl.$^7$ .................................................. B01F 3/04
(52) U.S. Cl. .................................. 261/94; 261/DIG. 72
(58) Field of Search ...................... 261/94–98, DIG. 72; 210/150; 202/158; 422/211, 310; 95/211; 96/290

(56) References Cited

U.S. PATENT DOCUMENTS

| | | | | |
|---|---|---|---|---|
| 2,867,425 A | * | 1/1959 | Teller | 261/95 |
| 3,752,453 A | * | 8/1973 | Doyne | 261/94 |
| 4,086,307 A | * | 4/1978 | Glaspie | 210/150 X |
| 4,122,011 A | * | 10/1978 | Strigle, Jr. | 210/150 |
| 4,203,935 A | * | 5/1980 | Hackenjos | 261/98 |
| 4,425,285 A | * | 1/1984 | Shimoi et al. | 261/95 |
| 4,554,114 A | * | 11/1985 | Glen et al. | 261/95 |
| 4,668,442 A | * | 5/1987 | Lang | 261/94 |
| 4,731,205 A | * | 3/1988 | McNulty | 261/94 |
| 5,194,231 A | * | 3/1993 | Gough et al. | 261/94 X |
| 5,670,095 A | * | 9/1997 | Southam | 261/97 |
| 5,690,819 A | * | 11/1997 | Chianh | 261/DIG. 72 |

* cited by examiner

Primary Examiner—Richard L. Chiesa
(74) Attorney, Agent, or Firm—Herbert M. Hanegan, Esq.; Dale Lischer, Esq.; Eric J. Hanson, Esq.

(57) ABSTRACT

A packing material unit for liquid-gas contact apparatus which has a first plurality and a second plurality of loops (15) being at a first angle (loop 15) or a second angle (loops 15' and 15"), respectively, the second angle being the opposite of the first angle, with the first loops and the second loops alternating, and an interior support for maintaining the loops of at their respective angles. The loops have an interior point and an exterior point, and an interior support connects the interior points. There is also an exterior ring (25) for connecting the exterior points of the loops. The loops, interior support, and exterior ring also have a plurality of protuberances (35, 65, 95).

4 Claims, 3 Drawing Sheets

PACKING UNIT

The present invention is related to Provisional Application Ser. No. 60/099,326, filed on Sep. 6, 1998.

TECHNICAL FIELD

The present invention relates to packing units used in air pollution control equipment, gas and liquid contact apparatus for absorption or desorption of gas, rectification columns, mist and entrainment separation of solid and liquid particulates, and the like.

BACKGROUND OF THE INVENTION

Packing materials are of various sizes and shapes, usually designed to bring two phases of a system, typically a gas or mist and a liquid, into intimate contact. Filamentous packing materials are disclosed in U.S. Pat. Nos. 2,867,425 and 3,752,453. Other known packing configurations are Berl saddles and Raschig rings.

Packing materials accomplish their purpose either by presenting an extended thin film of one phase, usually the liquid, to the other phase or by constantly renewing the surface of one phase, usually the liquid, so that the most efficient mass transfer between phases can occur with the least expenditure of energy. The surface area of the packing material is therefore an important factor.

Interstitial holdup points are points where the surface of one phase is renewed by agglomeration and redispersion, to provide a fresh unsaturated surface to the other phase. The number of interstitial holdup points provided per cubic foot of packing material is thus extremely important.

Interstitial holdup points are provided both by the shape of the packing material unit and by its intersections with the packing material units ("packing units") immediately surrounding it. Interlocking increases the number of contact points between packing units and therefore increases the number of interstitial holdup points. However, interlocking also has disadvantages, such as the tendency to block fluid flow and thus increase the pressure drop through the packed space, such as a packed column. Interlocking where a packing unit fits within another packing unit is referred to as "nesting" and can dramatically block the fluid flow and significantly increase the pressure drop. Extensive interlocking also requires more packing units per cubic foot, thereby increasing the weight and cost, which are particularly significant considerations in large installations.

Interlocking can be prevented, but this usually reduces the number of interstitial holdup points. Therefore, complete prevention of interlocking of prior art packing units may not be desirable. The preferred packing unit would provide a large number of independent interstitial holdup points so that reliance for such holdup points from contact with other packing units by interlocking is lessened, and interlocking can be reduced without significant adverse effect. Such a packing unit would have the capacity to provide better phase surface regeneration even without being interlocked with other packing units and would simultaneously require less pressure drop through the packed space, thus increasing efficiency.

SUMMARY OF THE INVENTION

Accordingly one object of the present invention to provide a packing unit for a liquid-gas contact apparatus by which more efficient operation of the apparatus is achieved while using fewer packing units per cubic foot.

Another object of this invention is to provide a packing material unit which provides for less interlocking with other packing units thereby requiring fewer units per cubic foot while simultaneously providing within each packing unit an increase in contact between the gas and liquid phases passing through the apparatus.

A further object of this invention is to provide more independent interstitial holdup points, and thus better phase surface regeneration, in an individual packing unit, thus reducing dependency on contact by the packing unit with surrounding or interlocked packing units to achieve the desired number of holdup points.

Still another object of the present invention is to provide a packing unit which results in the maximum time for mass transfer between the liquid phase and the gas or mist phase by increasing within the unit itself the number of points of surface regeneration.

Yet another object of this invention is a packing unit which provides a longer retention time of the liquid phase passing through a liquid-gas contact apparatus while reducing the pressure drop in the gas phase through the apparatus.

By the present invention, a surface or surfaces of a packing unit are provided with sharply contoured projections which define abrupt interruptions to liquid flow along the surface and which reduce interlocking between adjacent units.

Such projections can be of any number of different structural configurations designed to achieve rapid breaking up of liquid flow contacting the projection either as a result of impact therewith by dropping from a unit thereabove or by contact therewith during flow along the packing unit surface. For example, the projections can be cylindrical, square, rectangular, triangular, chisel pointed, oval shaped, or diamond shaped. It is necessary that the projections or recesses define abrupt changes in the surface contour to cause immediate splitting or breaking of liquid impinging thereagainst to facilitate rapid surface regeneration. Such splitting or breaking of liquid is distinguished from unit surface configurations designed simply to provide a larger surface area and then to spread or guide liquid flow evenly relative to or across that surface area. The present invention is characterized by providing more holdup points and at the same time more positive breaking of liquid flow whereby acceleration of surface regeneration is achieved without the degree of interlocking heretofore required to achieve the desired number of holdup points.

Although applicable to any of the known packing unit configurations, such as the Berl saddles and Raschig rings mentioned above, the present invention is described in conjunction with a filamentous packing unit. Such a filamentous packing unit may be provided in any suitable configuration and is described herein in a preferred form which is a torus having a plurality of loops having internal offsets, an exterior ring, and an interior support. The loops, the exterior ring, and the interior support each have protuberances which provide interstitial holdup points. It will be appreciated that the specific loop configuration described hereinafter is but one of many loop configurations which could be designed without departing from the basic configuration of a plurality of loops having internal offsets and being oriented about a central axis.

In the preferred packing unit configuration, each loop is a filament having a first half in a first plane and a second half in a second plane, the two planes preferably being parallel and slightly offset from each other, so that a loop is not in a single plane, and the two halves conveniently being joined to each other at their open ends. This loop configuration is altered by abrupt internal projections, external projections, and internal connecting projections. The internal connecting projections connect a point on a first half of the loop with a point on the second half of the loop so as to provide a pathway between those points and provide strength to the loop and to the packing unit.

Each loop is connected to first and second adjacent loops, with a first half of the loop being connected by one or more cross bridges to a corresponding first half of a first adjacent loop, and with the second half of the first loop being similarly connected by one or more cross bridges to a corresponding second half of a second adjacent loop. In addition, the cross bridges preferably have projections.

The first and second planes of a loop are mirror planes to the first and second planes of an adjacent loop. That is, the first planes are not parallel to each other and will intersect, and the second planes are not parallel to each other and will intersect.

The external ring has a plurality of first projections which extend radially outward from the ring, and a plurality of second projections which extend coaxially with the ring. The external ring preferably encircles and is connected to the outer open ends of the loop halves.

The interior support is connected to the inner open ends of the loops, has a plurality of interior projections which converge at the axis of the interior support, and has a plurality of exterior projections which extend coaxially with the axis of the interior support and the packing unit.

This configuration effectively reduces nesting or interlocking of packing units, and defines a plurality of holdup points therein. The abrupt changes in the surface contour of the loops and ring of the preferred embodiment advantageously lend to the manufacture of a packing unit which provides numerous small targets for the inertial impactment of liquid or solid particulates from an airstream. A multitude of small targets is well established as providing better efficiency in particulate removal. The preferred embodiment of this invention allows the interstitial or surface renewal points to be maintained for maximum gas absorption or desorption, while obtaining good efficiencies in particulate removal as well. By reducing interlocking and compacting of the units a reduction in pressure drop through a body of packing units is achieved as compared to prior art units which provide the same degree of removal.

This configuration provides substantial strength, such that the packing units can be stacked to large heights and handled with little care without collapsing or distorting. This benefit is provided with little added weight or cost over conventional packing units.

DETAILED DESCRIPTION OF THE INVENTION

Figure 1:
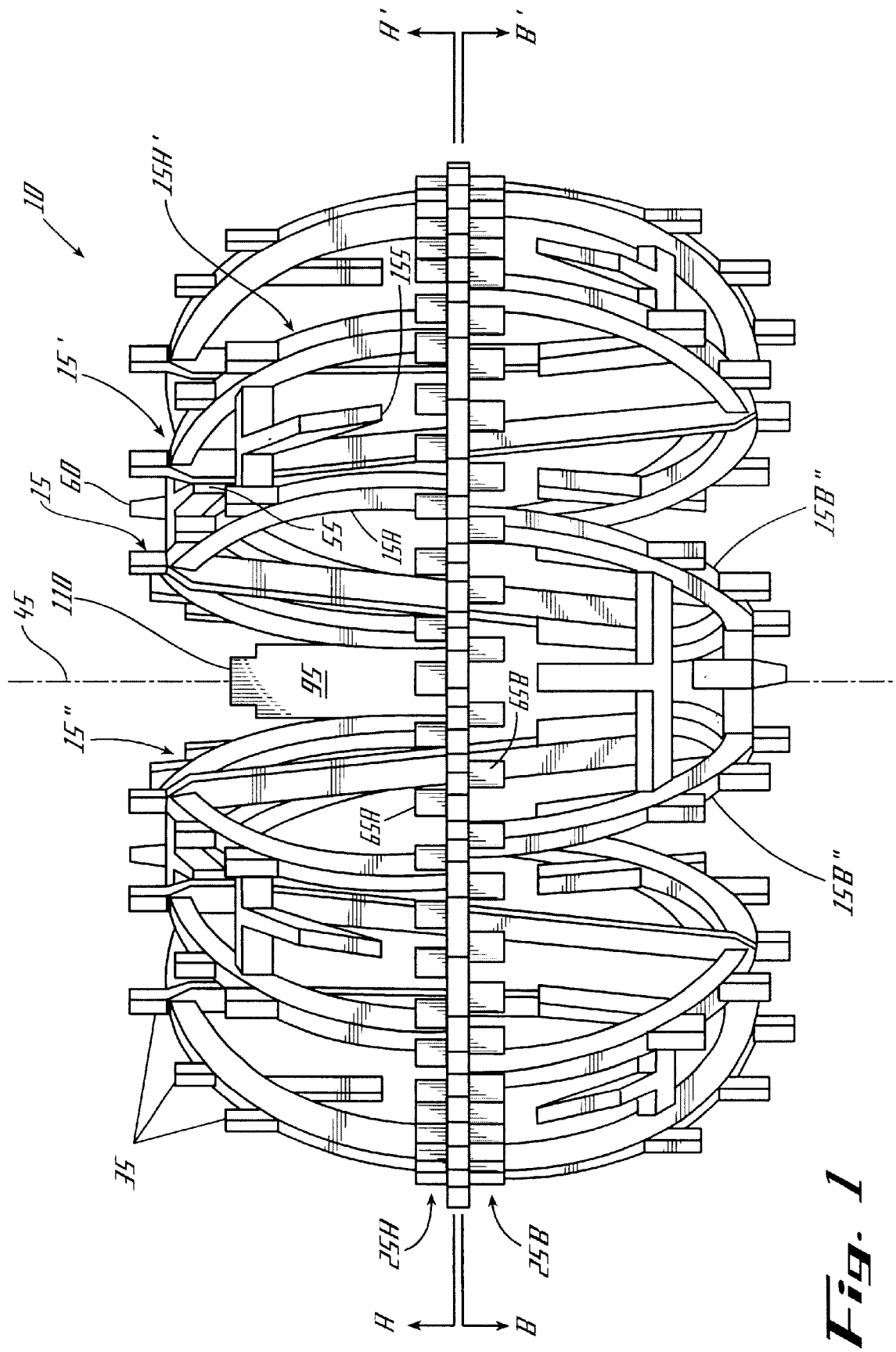
FIG. 1 is a side elevation view of the preferred embodiment of the packing unit.

The packing units of the present invention are preferably produced from a material which is not affected by the process conditions. Accordingly, many plastic materials are suitable for use in making the packing units. Polypropylene, polyethylene, polyvinyl chloride, chlorinated polyvinyl chloride, nylon, fluorocarbons, polystyrene and the like are suitable materials. Preferably polyethylene is employed, and injection molding is used to manufacture the packing units. Although plastic materials are preferable, metals can be employed to produce packing units. The present invention provides the following advantages: fewer packing units of the present invention are required per cubic foot of packing space; the pressure drop achieved with the packing units of the present invention is less than for prior art packing units; the efficiency of a single packing unit of the present invention is similar to that of prior art units but at a lower pressure drop; and the packing units of the present invention are less prone to nesting.

Savings in the capital cost and the cost of operation of a packed separation unit can be readily achieved employing the packing units of the present invention. In this respect, fewer packing units per cubic foot are required and the gas fan horsepower can be less in view of the lower pressure drop through the unit, thus achieving a high level of efficiency.

The above benefits are derived by providing for the individual packing units to have sharply defined deviations from the surface contours thereof, which deviations function both to increase the number of holdup or drip-off points on the unit itself and reduce the amount of interlocking with an adjacent unit, and to have adjacent loops to be in different planes, which also function to reduce the amount of interlocking with an adjacent packing unit. Thus, in a given mass of such packing units, fluid flowing therethrough, influenced by gravity only and not by forced flow, impinges against an abrupt projection and is immediately broken or diverted to leave the surface of one packing unit and drop to another surface of the same packing unit or a surface of another packing unit. Thus, rapid surface regeneration is realized. Moreover, the reduction in interlocking provides a less compact mass and thus provides for less pressure drop of gas passing through the mass. The increase in holdup or drop-off points per unit together with the decrease in interlocking provides for separation apparatus operation with fewer packing units per cubic foot without adversely affecting efficiency. In addition, the design provides for increased structural strength so that the packing units are less susceptible to damage.

The packing unit of the present invention provides more turbulence than prior art packing units, provides more surface area, provides more renewal of the liquid surface area, provides a low pressure drop, is very resistant to nesting, is very lightweight, is very strong, is larger than prior art units so fewer packing units are required per unit of volume. Further, the packing unit may be used to remove gases from a liquid in addition to the standard use of remove particulates and solubles from a gas.

Figure 2:
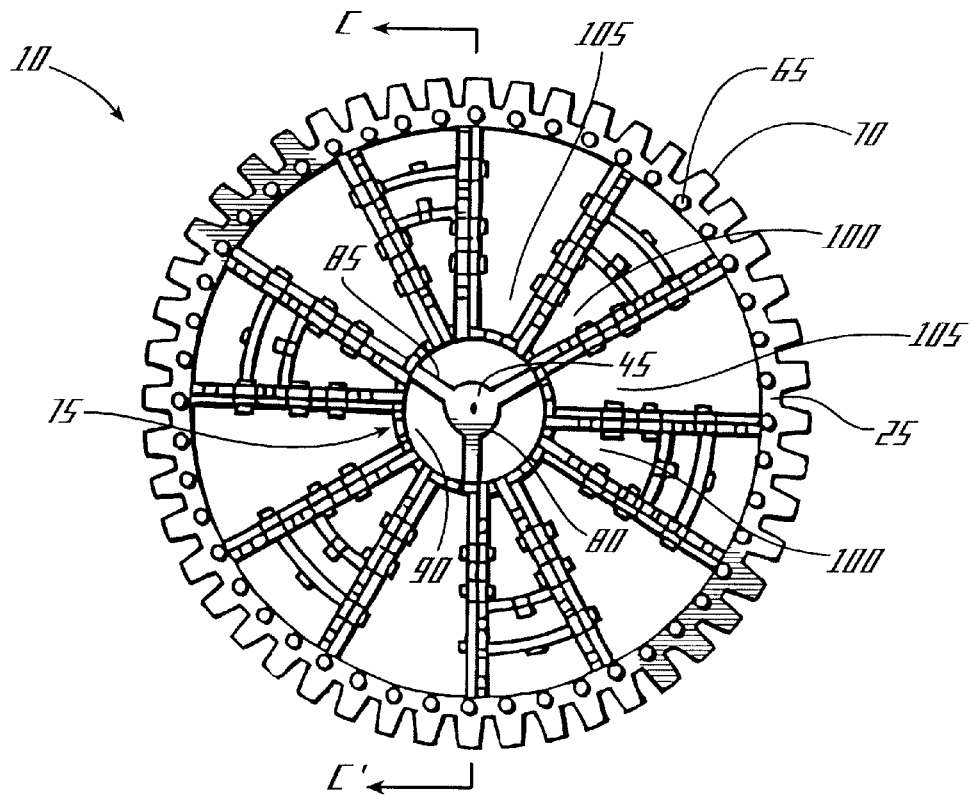
FIG. 2 is a cutaway view along plane A–A' of FIG. 1.
Figure 3:
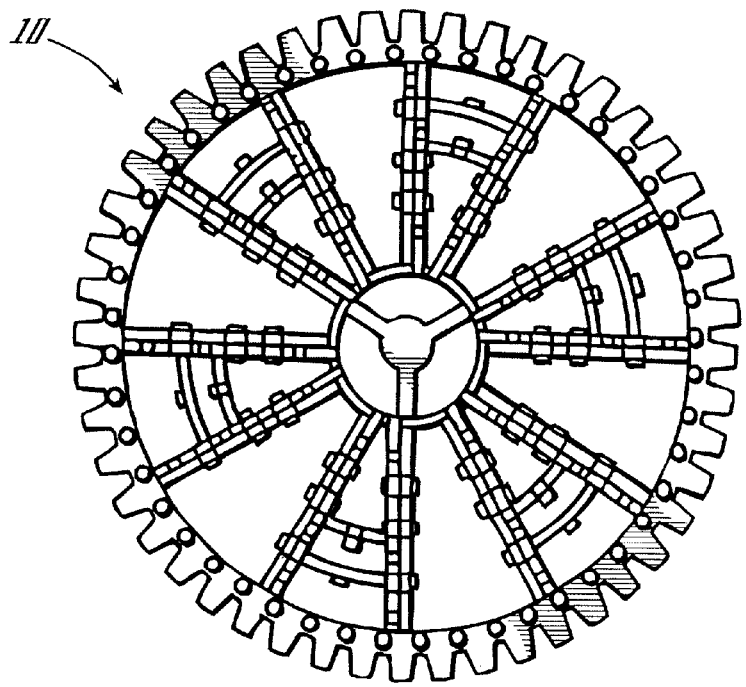
FIG. 3 is a cutaway view along plane B–B' of FIG. 1.
Figure 4:
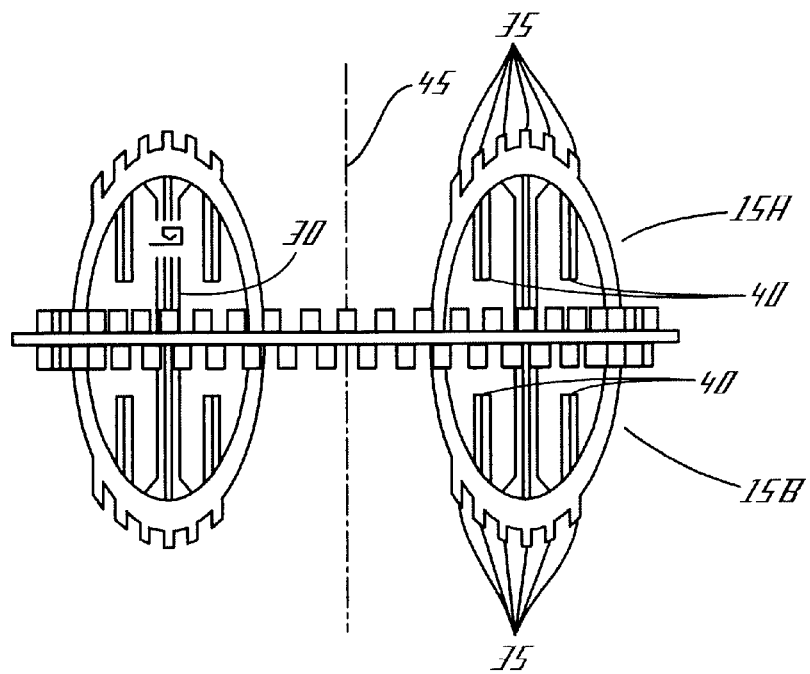
FIG. 4 is a view of two loops along plane C–C' of FIG. 2.

Refer now to the drawings in which like numerals represent like components throughout the several figures. FIG. 1 is a side elevation view of the preferred embodiment of the packing unit 10. A packing unit 10 has a diameter of approximately 4 inches, and a height of approximately 2½ inches. FIG. 2 is a cutaway view along plane A–A' of FIG. 1, and FIG. 3 is a cutaway view along plane B–B' of FIG. 1. A packing unit 10 comprises a plurality of loops 15, an exterior ring 25, and an interior support member 30. FIG. 4 is a view of two loops 15 along plane C–C' of FIG. 2 with the exterior ring 25 being shown for reference. A loop 15, not including protuberances, has a height of approximately 2 inches, and a width of approximately 1⅛ inches, and the filament forming the loop has a thickness of approximately 0.113 inches, and a width of approximately ¹⁄₁₆ inch.

Referring to FIG. 4, for convenience of manufacturing, the top half 15A of a loop 15 is identical to the bottom half 15B of a loop 15. Therefore, the view of the packing unit 10 along plane A–A' in FIG. 2 is almost symmetrical to the view of the packing unit 10 along plane B–B' in FIG. 3. However, these views of the packing unit 10 are not exactly symmetrical because the view along plane B–B' (the bottom half of the packing unit 10) is rotated slightly with respect to the view along plane A–A' (the top half of the packing unit 10). Therefore, the plane of the top half 15A of a loop will be parallel to, but slightly offset from, the plane of the bottom half 15B of the loop.

The top half 15A of a loop is connected to the bottom half 15B of the loop by a rib 30, which is in the form of an "X". One leg of the "X" of the top half of the rib 30 is almost in the same plane as the top half 15A of a loop, and the other leg of the "X" of the top half of the rib 30 is almost perpendicular to that plane. Similarly, one leg of the "X" of the bottom half of the rib 30 is almost in the same plane as the bottom half 15B of a loop, and the other leg of the "X" of the bottom half of the rib 30 is almost perpendicular to that plane. The term "almost" is used because the planes of loop halves 15A and 15B are parallel, but offset, and the rib 30 must traverse the offset, so it is not exactly parallel to or perpendicular to either plane. A rib preferably has a thickness of ⅛ inch from one end of leg to the other end of a leg, with a leg preferably having a thickness of approximately ³⁄₆₄ inch.

A loop 15 has a plurality of exterior protuberances 35, each of which protuberances 35 is approximately ³⁄₃₂ inch high and is preferably a ¹⁄₁₆ inch square post with a flat end, and which is preferably in the same plane as the half of the loop 15 to which it is connected. A typical protuberance 35 has a short side and long side because it is mounted on a curved surface so the height above is the short side.

A loop 15 also has a plurality of interior protuberances 40, each of which protuberances 40 is approximately ½ inch long and is preferably a T-post with a flat end, with the top of the "T" being in the same plane as the half of the loop 15 to which it is connected. As described below, a loop half is also connected to a corresponding loop half of an adjacent loop, and the leg of the "T" is pointed toward that adjacent loop half.

The loops 15 dispose generally radially outward from the central axis 45 of the packing unit 10 with one vector of the plane of a loop half, for example 15A, proceeding radially outward, and being perpendicular to, the axis 45, and with the other vector of the plane being slightly angled with respect to the axis 45. Thus, the loops are slightly slanted, when the packing unit is viewed from the side, such as FIG. 1. Furthermore, the slant of a loop 15 is opposite to the slant of adjacent loops, such that the plane of the top half 15A of a loop 15 and the plane of the top half 15A' of an adjacent loop 15' would meet. Likewise, the plane of the bottom half 15B of a loop 15 and the plane of the bottom half 15B" of an adjacent loop 15" would meet.

Figure 5:
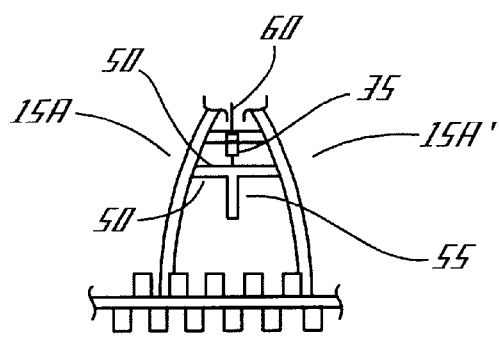
FIG. 5 is a view of the cross bridges between two loop halves.

FIG. 5 is a view of the cross bridges between two loop halves. In the preferred embodiment, as shown by FIGS. 1 and 5, the top half 15A of a loop and the top half 15A' of an adjacent loop 15' are connected by a plurality of cross bridges 50, preferably at least two. Each cross bridge 50 has a protuberance 55, and at least the cross bridge 50 closer to the axis 45 has another protuberance 60. A protuberance 55 points toward the planes A–A' (top half of a packing unit 10) and B–B' (bottom half of a packing unit 10). A protuberance 60 preferably points parallel to the axis 45 but may lie along the plane of the half of the loop 15 to which it is connected.

The cross bridges 50 preferably have a rectangular cross section, and are disposed to circumferentially connect the two halves of the loops. The outer cross bridge 50 is approximately ¾ inch from (above or below) the exterior ring 25, and has a width of approximately 0.063 inch, a height of approximately ⁵⁄₃₂ inch, and a length of approximately ½ inch. The inner cross bridge 50 is approximately 1 inch from (above or below) the exterior ring 25, and has a width of approximately 0.063 inch, a height of approximately ⅛ inch, and a length of approximately ⅜ inch.

The protuberances 55 preferably emerge from the cross bridges 50 as either square or rectangular posts, and end as chisel points. The protuberances 55 from the outer cross bridges 50 preferably have a width of approximately ¹⁄₁₆ inch and a length of approximately 0.25 inch. The protuberances 55 from the inner cross bridges 50 preferably have a width of approximately ¹⁄₁₆ and a length of approximately 0.125 inch.

The protuberances 60 preferably emerge from the cross bridges 50 as round posts with flat ends, and are preferably approximately ⅛ inch high cones having a circular base of approximately 0.085 inch diameter and a circular top of approximately ¹⁄₁₆ inch diameter.

Figure 6:
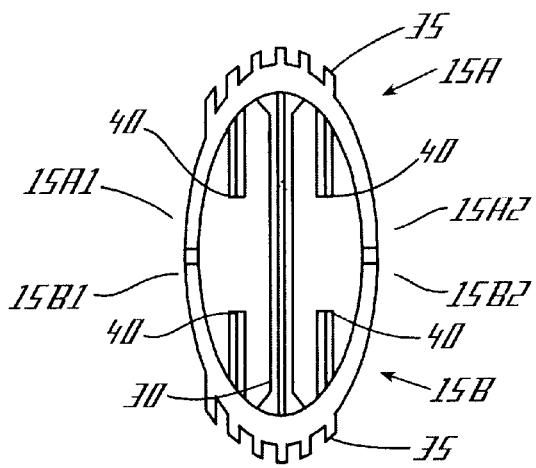
FIG. 6 is a side view of a loop.
Figure 7:
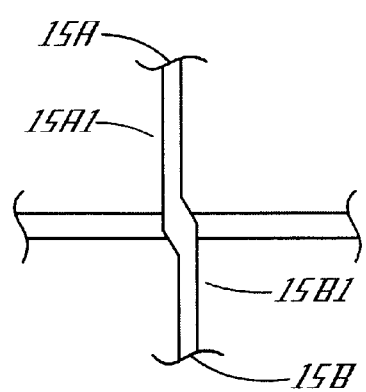
FIG. 7 is a view of the intersection of the loop halves.

The cross section of the filament structure of a loop 15 is preferably rectangular, with the width being the narrower dimension. As shown in FIG. 6, which is a side view of a loop 15, and FIG. 7, which is a view of the intersection of the loop halves, the loop halves 15A and 15B have interior ends 15A1 and 15B1, respectively, which are closer to the axis 45, and exterior ends 15A2 and 15B2, respectively, which are farther from the axis 45. The interior ends 15A1 and 15B1 of a loop are offset by the width of the loop. Therefore, the loop halves 15A and 15B slightly overlap at their ends so that a continuous loop 15 is formed. This offset provides additional strength. The ends 15A1 and 15B1 are preferably tapered toward the overlapped section. Similarly, the exterior ends 15A2 and 15B2 of a loop are offset by the width of the loop, the loop halves 15A and 15B slightly overlap at their ends so that a continuous loop 15 is formed, and the ends 15A2 and 15B2 are preferably tapered toward the overlapped section.

In the preferred embodiment, there are twelve loops 15. Because of the offsets and the opposite angles of adjacent loops, the interior ends of the top halves of two adjacent loops which are connected by cross bridges 50 will be close or touching, as indicated by 100 in FIG. 2. Conversely, the interior ends of the top halves of two adjacent loops which are not connected by cross bridges 50 will be farther apart, as indicated by 105. Similarly, the interior ends of the bottom halves of two adjacent loops which are connected by cross bridges 50 will be close or touching and the interior ends of the bottom halves of two adjacent loops which are not connected by cross bridges 50 will be farther apart. Thus, if twelve loops 15 are used, there will be six areas 100 and six areas 105 on the top half of the packing unit 10, and the same number on the bottom half of the packing unit 10.

The interior support 75 (FIG. 2) comprises a central circular area 80, radial arms 85, preferably at least three, a circular band 90, and protuberances 95 (FIG. 1). The interior support 75 preferably has a thickness of approximately 0.060 inch, an inner radius of approximately 0.437 inch, and a height to match the height of the radial arms 85. The central area 80 preferably has a radius of approximately ⅛ inch and a height to match the height of the radial arms 85.

The radial arms 85 are interposed between the center area 80 and the band 90, and have a width of approximately 0.075 inch, and a height of approximately ⅛ inch. The band 90 connects to, and is part of, the loops 15 where the interior ends 15A1 and 15B1 overlap. The band 90 may be considered to be a plurality of arc segments which connect the interior points of adjacent loops.

The protuberances 95 are preferably placed at every other area 105 on the top half of the packing unit 10 and at every other area 105 on the bottom half of the packing unit 10. Thus, there are three protuberances 95 on the top half and three protuberances 95 on the bottom half. A protuberance 95 encompasses an arc and may be viewed as a curved rectangular piece, with the curve matching the radius of the circular band 90, and extending coaxially with the axis 45. Each protuberance 95 preferably ends with a smaller, trapezoidal, flat-ended protuberance 110. Each protuberance 95 preferably has a length of approximately ¼ inch, a height of approximately ¾ inch, and a thickness matching the thickness of the interior support 75. The smaller protuberance 110 preferably has a height of ⅛ inch and a top length of 3/32 inch.

The exterior ring 25 (FIG. 2) preferably has thickness of approximately 0.060 inch, a depth of approximately 0.085 inch, and an inner radius of approximately 1.766 inch.

The exterior ring 25 has a plurality of coaxial protuberances 65 which are parallel to the axis 45. The coaxial protuberances 65 on one side 25A of exterior ring 25 are preferably offset with respect to the protuberances 65 on the other side 25B of exterior ring 25, such as shown by protuberances 65A and 65B in FIG. 1. The protuberances 65 are preferably round or conical posts with flat ends, and have a base radius of approximately 0.085 inch, a top radius of approximately 1/16 inch, and a height of approximately ⅛ inch.

The exterior ring 25 also has a plurality of radial protuberances 70 (FIG. 2). The protuberances 70 are preferably trapezoidal shaped or flat ended teeth, and have a base width of approximately 3/16 inch, a top width of approximately 9/64 inch, and a length of approximately 11/64 inch. The thickness of a protuberance 70 preferably matches the thickness of the exterior ring 25. The protuberances 65 preferably lie along the same radials as the protuberances 70.

The protuberances of the loops 15, the exterior ring 25, the cross bridges 50, and the interior support member 75 thus provide a large number of interstitial holdup points.

Nesting occurs with prior art packing units when one packing unit becomes positioned directly above another packing unit. The units may then rotate axially until the peaks of one unit match the dips in the other unit. The units will then nest, which decreases the fluid flow and increases the pressure drop through the packing column. Consider now the packing units 10 of the present invention. When one packing unit 10 becomes positioned directly above the other packing unit 10, the numerous protuberances will contact each other and prevent rotation of the units. It will also be noted that, due to the offset of the loops 15 and the angles of the loops 15, the protuberances 95 on the top half of the packing unit 10 do not lie directly above the protuberances 95 on the bottom half of the packing unit 10. Thus, even if the packing units 10 are directly lined up, so that peaks of one unit match the dips in the other unit, the protuberances 95 will contact each other and prevent or significantly limit nesting. Therefore, the protuberances, the angles of the planes of the loops 15, the exterior ring 25, and the interior support member 75 act together to provide a packing unit which is very resistant to nesting or interlocking.

If a force is applied to the top of a packing unit 10, the loops, cross members, ribs, and interior support will redistribute the force among the various components. If a force is applied laterally to a packing unit 10, the exterior ring, the loops, the cross bridges, and the interior support will redistribute the force among the various components. Thus, the loops, the ribs, the exterior ring, the cross bridges, and the interior support act together to provide a packing unit which has great physical strength and is highly resistant to crushing.

It will be appreciated that the number of loops, the offset of a loop, the angles of the loops, and the number and type of ribs, cross bridges, protuberances, cross sections of the various components, and ends of the various components, may be varied without departing the scope of the present invention. Also, modifications and alterations of the present invention, such as adding nicks, notches, indentations, or other abrupt surface discontinuities, will occur to others upon reading this specification. Accordingly, all such modifications and alterations are included insofar as they come within the scope of the claims or the equivalence thereof.

I claim:

1. A packing unit for liquid-gas contact apparatus, comprising:

a first plurality of loops arranged about an axis, each loop of said first plurality being at a first angle with respect to a predetermined reference, said loops of said first plurality each having a top part and a bottom part, each loop of said first plurality having an interior point closer to said axis and connecting said top part of said loop with said bottom part of said loop, each loop of said first plurality having an exterior point farther from said axis and connecting said top part of said loop with said bottom part of said loop, each loop of said first plurality having a plurality of protuberances, a said top part of a said loop being offset from a said bottom part of said loop;

a second plurality of loops arranged about said axis, each loop of said second plurality being at a second angle with respect to said predetermined reference, said second angle being the opposite of said first angle, each loop of said second plurality having an interior point closer to said axis and connecting said top part of said loop with said bottom part of said loop, each loop of said second plurality having an exterior point farther from said axis and connecting said top part of said loop with said bottom part of said loop, each loop of said second plurality having a plurality of protuberances, said loops of said second plurality each having a top part and a bottom part, a said top part of a said loop being offset from a said bottom part of said loop;

said first loops and said second loops alternating;

an interior support comprising a central area, said central area being a disk centered on said axis, a plurality of radial arms, a plurality of segments, and a plurality of protuberances, said radial arms being connected to and extending radially outward from said central area, each said segment connecting an interior point of a loop of said first plurality of loops to an interior point of a loop of said second plurality of loops, said protuberances being parallel to said axis and extending from predetermined ones of said segment, said interior support maintaining said loops of said first plurality of loops at said first angle and said loops of said second plurality of loops at said second angle;

an external ring for connecting said exterior points of said loops of said first plurality and said exterior points of said loops of said second plurality;

a first plurality of ribs, each rib of said first plurality of ribs connecting a said top part of a loop of said first plurality of loops to a said bottom part of said loop of said first plurality;

a second plurality of ribs, each rib of said second plurality of ribs connecting a said top part of a loop of said second plurality of loops to a said bottom part of said loop of said second plurality;

a plurality of cross bridges, each said cross bridge extending from and connecting a said loop of said first plurality to an adjacent loop of said second plurality, each said loop of said first plurality being connected to two said cross bridges, both of said cross bridges being connected to said adjacent loop of said second plurality; and a protuberance extending from each said cross bridge.

2. A packing unit for liquid-gas contact apparatus, comprising:

a first plurality of loops, each loop of said first plurality being at a first angle with respect to a predetermined reference;

a second plurality of loops, each loop of said second plurality being at a second angle with respect to said predetermined reference, said second angle being the opposite of said first angle, said first loops and said second loops alternating;

an interior support for maintaining said loops of said first plurality at said first angle and said loops of said second plurality at said second angle;

a plurality of cross bridges, each said cross bridge extending from and connecting a said loop of said first plurality to an adjacent loop of said second plurality, and wherein said loop of said first plurality is connected to only a single said cross bridges;

a protuberance extending from each said cross bridge;

each said cross bridge extending from and connecting a said loop of said first plurality to an adjacent loop of said second plurality, wherein each said loop of said first plurality is connected to two said cross bridges, both of said cross bridges being connected to said adjacent loop of said second plurality;

wherein said interior support has an axis and a plurality of protuberances, each of said protuberances being parallel to said axis, and said interior support comprises a central area and a plurality of radial arms, said radial arms being connected to and extending outward from said central area.

3. The packing unit of claim 2 wherein each loop of said first plurality of loops has a first interior point, and each loop of said second plurality of loops has a second interior point, and wherein a said second interior point is offset from a first adjacent first interior point by a first distance, and offset from a second adjacent first interior point by a second distance, said second distance being different than said first distance, thereby defining alternating large and small distances between interior points of adjacent loops connected to said interior support.

4. The packing unit of claim 1 wherein each loop of said first plurality of loops has a first exterior point, and each loop of said second plurality of loops has a second exterior point, and wherein a said second exterior point is offset from a first adjacent first exterior point by a first distance, and offset from a second adjacent first exterior point by a second distance, said second distance being different than said first distance, thereby defining alternating large and small distances between exterior points of adjacent loops connected to said outer ring.

* * * * *